United States Patent [19]
Bahner

[11] 3,815,853
[45] June 11, 1974

[54] PLANTER BOX AND STEM HOLDER

[76] Inventor: Elvin J. Bahner, Weimar, Tex. 78962

[22] Filed: Oct. 10, 1972

[21] Appl. No.: 296,117

[52] U.S. Cl.................. 248/44, 24/255 BS, 248/314
[51] Int. Cl............................................ F16m 13/00
[58] Field of Search......... 248/44, 46, 48, 314, 359; 161/21, 22, 24; 24/255 BS

[56] References Cited
UNITED STATES PATENTS

| | | | |
|---|---|---|---|
| 2,565,700 | 8/1951 | Schiller | 161/23 |
| 2,750,138 | 6/1956 | Morris | 248/44 |
| 2,771,260 | 11/1956 | Thom | 248/44 |

FOREIGN PATENTS OR APPLICATIONS

| | | | |
|---|---|---|---|
| 863,450 | 3/1961 | Great Britain | 161/24 |
| 234,103 | 4/1911 | Germany | 24/255 BS |

*Primary Examiner*—William H. Schultz
*Attorney, Agent, or Firm*—Ranseler O. Wyatt

[57] ABSTRACT

A planter box and stem holder for artificial plants having a container formed in the desired shape in which is mounted on the inside bottom thereof a platform having an axial orifice around the periphery of which a series of wire members are angularly mounted, with the lower ends of the wire members extending downwardly and inwardly to form a conical stem receiving area and an upper partition mounted in said container, in which an axial orifice is formed and on which a platform is formed having an axial orifice and a series of wire members angularly mounted around the periphery of said last mentioned orifice.

2 Claims, 4 Drawing Figures

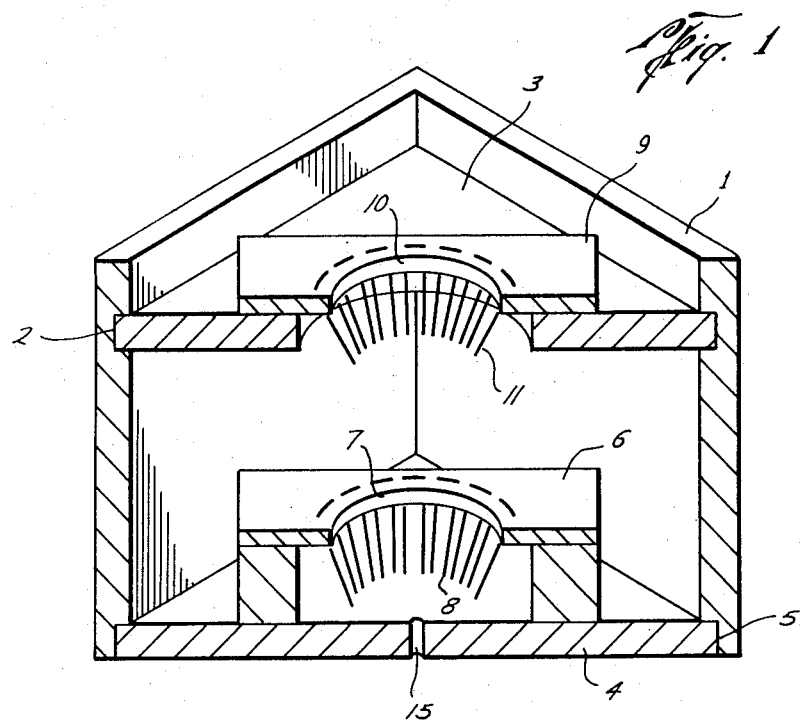
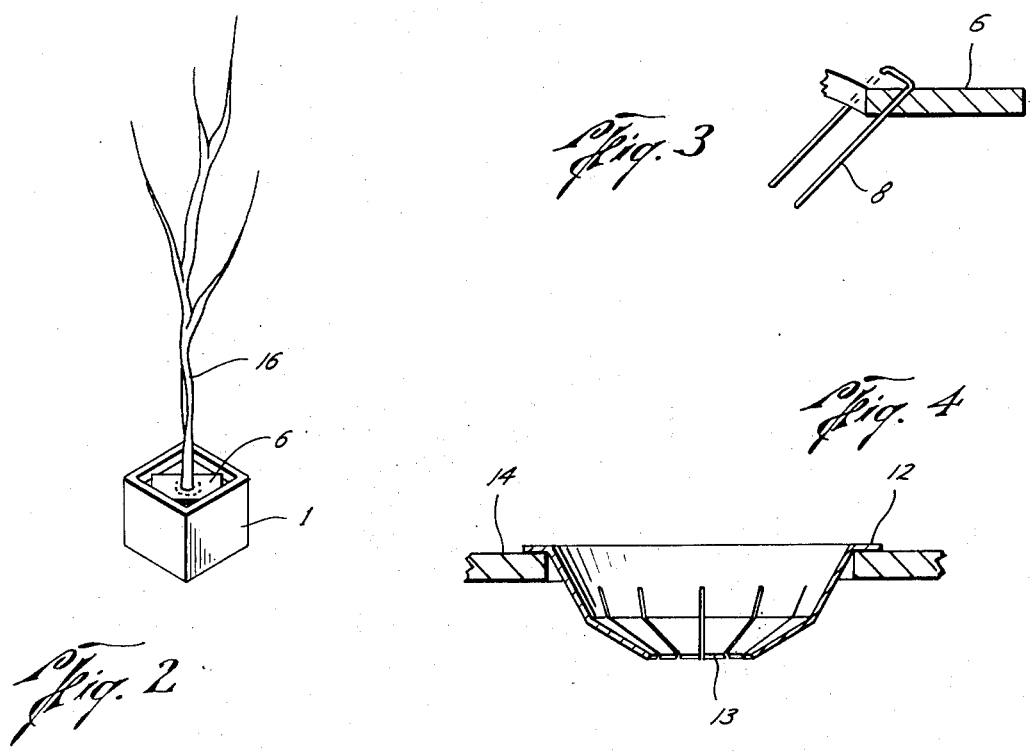

PLANTER BOX AND STEM HOLDER

SUMMARY OF THE INVENTION

A planter box for artificial plants having a horizontal partition mounted therein, said partition having an axial opening therein, a stem holding series of wires angularly mounted in said partition adjacent the periphery of said orifice and in vertical alignment with a similar wire member assembly mounted in the bottom of the container.

BRIEF DESCRIPTION OF THE DRAWINGS

FIG. 1 is a side elevational view of the planter box, in cross section.

FIG. 2 is a side elevational view of a planter with a plant mounted therein.

FIG. 3 is a side elevational, cross sectional view, illustrating the wire members mounted around the periphery of the axial orifice, and FIG. 4 is a side elevational view, in cross section, of a modification of the wire member assembly.

DESCRIPTION OF THE PREFERRED EMBODIMENT

In the drawings, the numeral 1 designates a planter box for artificial plants, formed of wood, or the like, of any desired shape, such as the square box shown in FIG. 2, having an internal groove in which the upper partition 3 may be mounted. The bottom of the planter may be formed by seating the floor 4 in a groove 5 in the side wall 1. A platform 6 is mounted on the floor 4, the top thereof being raised off of the floor 4, and a series of wire members 8 are mounted in the platform 6 around the periphery of the orifice 7. This is normally accomplished by forcing long wire brads through the material of the platform, at an angle, so that the ends of the brads extend through the material of the partition and downwardly and inwardly, in position to form a conical receiver for the stem of the artificial plant to be inserted therein. A guide holder 15 receives the point of the stem of the artificial plant to be mounted in the planter.

On the platform 3 is mounted the upper stem support consisting of the plate 9 having the axial orifice 10 and the wire members 11 angularly mounted around the periphery of the said orifice, forming the conical stem receiver.

The wire members shown consist of wire staples, or brads, which are driven through the material of the member 6 at an angle, forming the upper conical stem receiving area.

A modification of the idea is illustrated in FIG. 4 where the conical wire assembly mounted angularly to form the stem holder is formed of a solid sheet of metal 12, having the slits formed therein leading from a position adjacent the upper margin to the orifice 13. The slit portion tapers inwardly towards the orifice, and the holder 12 is mounted in the orifice in the platform and the upper partition of the planter, respectively.

In use the planter box will be assembled as above outlined and the size of the orifice will be sufficient to accomodate various sizes of artificial tree stems. The user will select the assembly 9 desired, depending upon the size of the stem of the artificial plant to be installed in the planter. The assembly 9 will be anchored to the partition 3 in any suitable manner, as by use of glue or screws, or the like, and the stem of the artificial plant, as 16, will then be inserted through the upper and lower orifices, the lower orifice being installed with the planter when the planter is constructed, and the ends of the wire members 8, 11 will bear against the stem of the artificial plant, locking the stem in place in the planter. Rocks, moss or artificial grass may then be placed on the platform for decoration, if desired, hiding the wire assembly.

What I claim is:

1. A planter for artificial plants having a container, bottom and side walls in said container, a lower stem support mounted on the bottom of said container, a partition mounted on the inside surface of the side walls of said container below the upper margin thereof, and an upper stem support mounted on said partition, said stem supports having a plurality of wires anchored at one end, the free ends being adapted to yield to the insertion of a stem of an artificial plant and to bear against and resist the removal of the stem from the planter, said upper and lower stem support each consisting of a rigid member having an axial orifice therethrough and said wire stem retaining members extending through said rigid member and positioned around the periphery of said orifice and their free ends extending into said orifice.

2. A planter for artificial plants having a container, bottom and side walls in said container, a lower stem support mounted on the bottom of said container, a partition mounted on the inside surface of the side walls of said container below the upper margin thereof, and an upper stem support mounted on said partition, said stem supports having a plurality of wires anchored at one end, the free ends being adapted to yield to the insertion of a stem of an artificial plant and to bear against and resist the removal of the stem from the planter, said lower support has a platform raised off of the bottom of said container, and a vertical axial orifice through said platform and said series of inwardly directed wire members extending horizontally through said platform and positioned around the periphery of said orifice have their free ends yieldably maintained in said orifice in position to bear against the stem of the plant to be inserted therein.

* * * * *